United States Patent
Busche et al.

(10) Patent No.: US 12,006,685 B2
(45) Date of Patent: Jun. 11, 2024

(54) WALLBOARD WITH FOAM MATERIAL LAYER

(71) Applicant: National Gypsum Properties, LLC, Charlotte, NC (US)

(72) Inventors: Bradley J. Busche, Shelby, NC (US); Joseph J. Bailey, Charlotte, NC (US); Brian G. Randall, Charlotte, NC (US); Michael N. Blades, Indian Land, SC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 66 days.

(21) Appl. No.: 17/118,835

(22) Filed: Dec. 11, 2020

(65) Prior Publication Data
US 2021/0180322 A1    Jun. 17, 2021

Related U.S. Application Data (60) Provisional application No. 62/947,087, filed on Dec. 12, 2019.

(51) Int. Cl.
| | |
|---|---|
| *E04C 2/288* | (2006.01) |
| *B32B 5/18* | (2006.01) |
| *B32B 9/00* | (2006.01) |
| *B32B 9/04* | (2006.01) |
| *B32B 9/06* | (2006.01) |

(Continued)

(52) U.S. Cl.
CPC ............ *E04C 2/288* (2013.01); *B32B 5/18* (2013.01); *B32B 9/005* (2013.01); *B32B 9/046* (2013.01); *B32B 9/06* (2013.01); *B32B 13/045* (2013.01); *B32B 13/08* (2013.01); *B32B 2266/02* (2013.01); *B32B 2266/0278* (2013.01); *B32B 2266/06* (2013.01); *B32B 2307/102* (2013.01); *B32B 2307/558* (2013.01); *B32B 2419/00* (2013.01); *E04B 1/90* (2013.01); *E04B 1/942* (2013.01)

(58) Field of Classification Search
CPC .. B32B 5/18; B32B 5/26; B32B 9/005; B32B 9/046; B32B 9/06; E04C 2/288; E04B 1/90; E04B 1/942
See application file for complete search history.

(56) References Cited

U.S. PATENT DOCUMENTS

| | | | | |
|---|---|---|---|---|
| 5,104,715 A | * | 4/1992 | Cruz ................... | E04C 2/205 |
| | | | | 428/140 |
| 6,241,815 B1 | * | 6/2001 | Bonen ................. | C04B 28/145 |
| | | | | 156/39 |

(Continued)

FOREIGN PATENT DOCUMENTS

| | | | | | |
|---|---|---|---|---|---|
| JP | 10218682 A | * | 8/1998 | ............ | C04B 38/08 |
| WO | WO-2019108163 A1 | * | 6/2019 | ............ | B32B 27/40 |

OTHER PUBLICATIONS

Translation of JP 10218682, Takeshi Tanaka, Aug. 18, 1998. (Year: 1998).*

*Primary Examiner* — Hai Vo
(74) *Attorney, Agent, or Firm* — Dority & Manning, P.A.

(57) ABSTRACT

Provided are wallboard panels that include a foam material layer and a core material, with one or more sheets of facer material and/or one or more sheets of backing material. The foam material layer may include one or more pores having an open pore geometry. Additionally, provided are methods of manufacturing such wallboard panels.

18 Claims, 4 Drawing Sheets

(51) Int. Cl.
  *B32B 13/04* (2006.01)
  *B32B 13/08* (2006.01)
  *E04B 1/90* (2006.01)
  *E04B 1/94* (2006.01)

(56) References Cited

U.S. PATENT DOCUMENTS

| | | |
|---|---|---|
| 9,903,116 B2 | 2/2018 | Ray |
| 10,731,337 B2 | 8/2020 | Garvey et al. |
| 2002/0088193 A1* | 7/2002 | Reimers .............. C08L 23/0815 52/403.1 |
| 2003/0032351 A1 | 2/2003 | Horner, Jr. et al. |
| 2005/0142348 A1 | 6/2005 | Kajander et al. |
| 2010/0256204 A1* | 10/2010 | Tinetti .................... B32B 13/08 514/369 |
| 2014/0273687 A1* | 9/2014 | Garvey .................. B32B 3/266 442/120 |
| 2016/0194866 A1* | 7/2016 | Jones .................. G10K 11/162 264/48 |
| 2018/0022856 A1* | 1/2018 | Wang .................. C08G 18/482 521/85 |
| 2019/0017261 A1 | 1/2019 | Chuda et al. |
| 2019/0030860 A1 | 1/2019 | Chuda et al. |
| 2020/0262180 A1 | 8/2020 | Hemphill et al. |
| 2020/0362555 A1 | 11/2020 | Athari et al. |
| 2020/0377425 A1* | 12/2020 | Kumar .................... C04B 14/24 |

* cited by examiner

WALLBOARD WITH FOAM MATERIAL LAYER

CROSS-REFERENCE TO RELATED APPLICATION

The present application claims filing benefit of U.S. Provisional Patent Application Ser. No. 62/947,087 having a filing date of Dec. 12, 2019, and which is incorporated herein by reference in its entirety.

BACKGROUND

Acoustical management through cementitious panels, such as wallboard, is an area of major concern in the building and construction industry. Creating a quiet, controlled home or work environment is important for the long-term health and productivity of building occupants. Additionally, due to the increased congestion and density of today's cities and multi-unit dwellings, sound control and dampening within a wall assembly is an increased focus for contractors and wallboard manufacturers. Thus, effectively addressing sound management in building management can provide value to both the building's present and future occupants and potentially increase marketability of the space.

Thermal management through cementitious panels can also be valuable to control thermal transmission within buildings. Indeed, having the ability to design a wall that can be insulative for controlling thermal conductance can be valuable, providing long-term value to consumers and builders, thus allowing property owners and residents to save money on heating and cooling costs.

Impact management through cementitious panels can also be a valuable contribution to the use and life of buildings. Indeed, having a wall that not only improves acoustical and thermal performance but that also mitigates impact damage and repair costs can be valuable, thus allowing property owners to save money on repairs in addition to heating and cooling costs.

Cementitious panels are generally formed of a cementitious core material that contains a hydraulically setting material such as gypsum, cement, or the like. The cementitious core material is typically sandwiched between sheets of facing material such as paper or paperboard, or woven or non-woven fibers or filaments. However, many cementitious panels, such as wallboards, utilized to build interior or exterior walls, have limited ability to control acoustical transmission, thermal transmission, and/or impact performance.

It would be desirable to provide cementitious panels, especially those utilized for interior or exterior walls, that have the ability to better control acoustics, provide thermal management, and/or provide impact resistance.

As a result, there remains a need for improved cementitious panels, such as wallboards, that have materials with improved acoustical management properties, thermal transmission performance properties, and/or impact resistance properties.

SUMMARY

Aspects and advantages will be set forth in part in the following description, or may be obvious from the description, or may be learned through practicing the presently disclosed subject matter.

In one aspect, the present disclosure provides a wallboard panel having a gypsum core material and one or more facing sheet materials comprised of a foam material layer having one or more pores with an open pore geometry. The one or more pores may include an open pore geometry or reticulated geometry.

In another aspect, the present disclosure provides a wallboard panel having a core, wherein the core material includes a foam material layer having one or more pores with an open geometry or reticulated geometry. The foam material may be surrounded by a gypsum core material. The wallboard panel may also include one or more sheets of facing material. The wallboard panel may also include a one or more sheets of backing material. The core may be sandwiched or surrounded by the one or more sheets of facing material and the one or more sheets of backing material.

In another aspect, the present disclosure provides methods of manufacturing a wallboard panel. An exemplary method may include formulating a gypsum slurry, dispensing the gypsum slurry on a first side of a foam material layer, and applying one or more backing material sheets over the gypsum slurry. The foam material layer may include one or more pores having an open pore geometry. Further, the gypsum slurry may penetrate the one or more pores of the foam material layer, or completely impregnate the foam material layer thus securing the gypsum slurry to the foam material layer.

In another aspect, the present disclosure details methods of manufacturing a wallboard panel. An exemplary method may include formulating a gypsum slurry, dispensing the gypsum slurry on a first side of a foam material layer and applying one or more facing material sheets over the gypsum slurry. The method further includes, dispensing the gypsum slurry on a second side of the foam material, and applying one or more backing material sheets on the gypsum slurry.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides wallboard panels that include a foam material layer that have one or more pores having an open pore geometry and methods for manufacturing such wallboard panels that include a foam material layer. The foam material layer contains one or more pores having an open pore geometry. The foam material layer may be used instead of and/or in addition to typical facing materials formed of paper or paperboard, or woven or non-woven fibers or filaments. The foam material layer may also be used or incorporated into the gypsum core of a wallboard material. Advantageously, the foam material layer may impart desired acoustic controlling properties, thermal controlling properties, and/or impact resistive properties to the wallboard without requiring additional coatings, adhesives, or manufacturing steps. In some embodiments, the foam material layer contains one or more pores, wherein at least 50% of the one or more pores have an open pore geometry.

Advantageously, the foam material layer can be secured to a gypsum core material, such as a gypsum slurry, without requiring modification to the gypsum core material. For example, no additional modifiers such as binders or adhesives may be required to secure the foam material layer to the gypsum slurry. Without being bound to any theory, it is believed that the gypsum slurry can penetrate the open pore geometry of the foam material layer, creating a physical-bond between the gypsum slurry and the foam material layer. Upon drying and/or curing, the gypsum core material is secured to and within the foam material layer.

The wallboard panels presently disclosed include construction materials commonly referred to as wallboard, drywall, gypsum board, cement board, backer board, fiber cement board, roof board, and the like. The wallboard panels disclosed may also be referred to as cementitious panels. These materials may be used for interior or exterior construction. Interior uses include finishing interior walls and ceilings and providing backing material for flooring such as tile, stone and the like. Exterior uses include exterior siding and roofing and providing backing material for other exterior siding or roofing materials such as stucco, masonry, shingles, and the like. Additionally, the wallboard panels may provide fire resistance, sound control, thermal control, and/or impact resistance. Wallboard panels may be formed with any desired dimensions. Standard dimensions for wallboard applications typically call for panels that are about 4-feet to 4-and-a half-feet wide and about 8-feet to 16-feet long, with thicknesses of about 3/16-inch to 2-inches. For example, in certain embodiments, the wallboard panels may have a thickness of about 3/16 inch. For example, in certain embodiments, the wallboard panels may have a thickness of about 1/4 inch. In some embodiments, the wallboard panels may have a thickness of about 1/2 inch. In some embodiments, the wallboard panels may have a thickness of about 5/8 inch. In some embodiments, the wallboard panels may have a thickness of about 3/4 inch. In some embodiments, the wallboard panels may have a thickness of about 1 inch. Of course, wallboard panels may also be manufactured according to other standard or non-standard dimensions.

The presently disclosed wallboard panels containing the foam material layer described herein may exhibit improved acoustical control properties. Incorporation of the foam material layer, as described herein, may provide additional sound dampening or reduce sound wave transmission through the wallboard material. Additionally, the foam material layer may provide sound absorption, thus reducing echoes or re-transmissions of sound waves.

In some embodiments, the wallboard panels containing the foam material layer described herein may exhibit improved thermal control properties. For example, in certain embodiments, the wallboard containing the foam material described herein may act as a thermal barrier for the room, thus preventing either cooler air or warmer air from diffusing through the wallboard and into other environments. Accordingly, the wallboard panels having the foam material layer may promote or facilitate easier thermal regulation within a room or within a space. Accordingly, less energy may be necessary in order to heat or cool a room to a certain temperature and to maintain the desired temperature within the room having the wallboard panels disclosed herein.

In some embodiments, the presently disclosed cementitious panels may include a foam material layer that provides enhanced fire-resistance capabilities. For example, incorporation of certain types of foam material layers may contain materials that provide enhanced fire resistance or the foam material may act as a thermal barrier providing improved fire resistance. A cementitious panel may include a polymeric-film facing material that contains filler materials, additives, and/or coatings that provide enhanced fire resistance.

In some embodiments, the presently disclosed cementitious panels may include a foam material layer that provides enhanced impact resistance capabilities. For example, incorporation of certain types of foam material layers, such as reticulated foams, may reduce or mitigate energy transmission to improve panel impact resistance and extend product life. Accordingly, less maintenance may be required during a product's lifetime with panels providing improved impact resistance.

It will be appreciated that the features and advantages of the presently disclosed wallboard panels may be provided individually or in combination. Exemplary embodiments will now be discussed in further detail with reference to the accompanying figures. It is understood that terms "upstream" and "downstream" refer to the relative direction that a material travels with respect to a process. For example, "upstream" refers to the direction from which a material travels, and "downstream" refers to the direction to which the material travels. It is also understood that terms such as "top", "bottom", "outward", "inward", and the like are words of convenience and are not to be construed as limiting terms. As used herein, the terms "first", "second", "third", and "fourth" may be used interchangeably to distinguish one component from another and are not intended to signify importance of the individual components. The terms "a" and "an" do not denote a limitation of quantity, but rather denote the presence of at least one of the referenced items.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value or the precision of the methods or machines for constructing or manufacturing the components and/or systems.

Figure 1A:
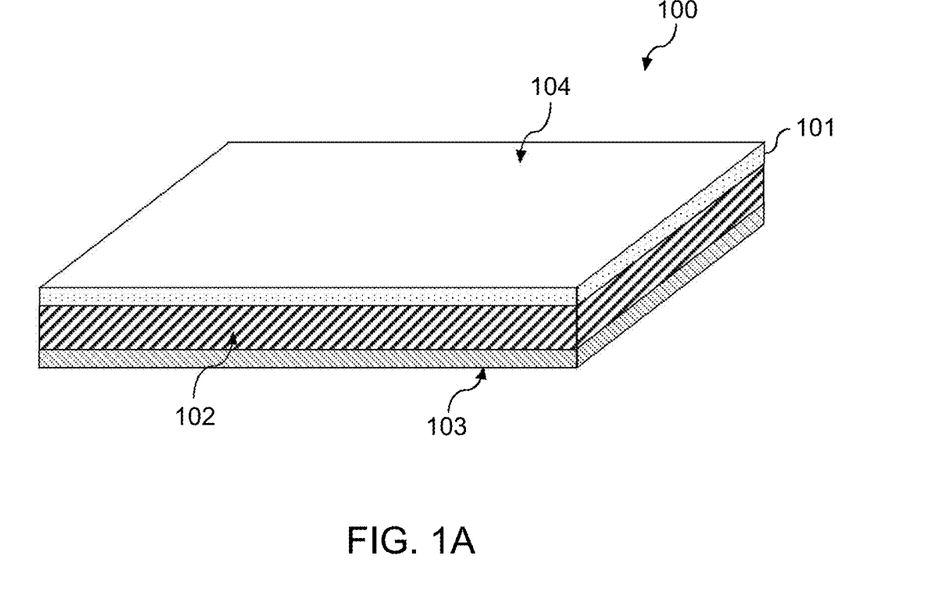
FIG. 1A schematically shows a perspective view of an exemplary wallboard panel.
Figure 1B:
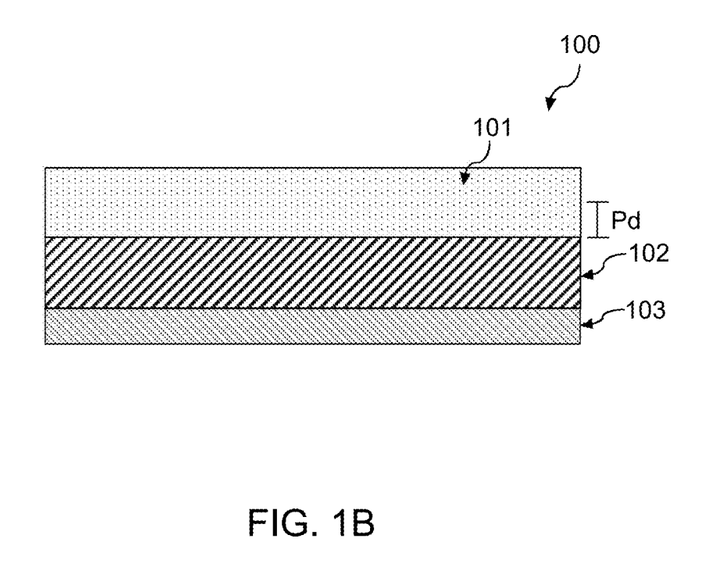
FIG. 1B schematically shows a cross-sectional view of an exemplary wallboard panel.

Now referring to FIGS. 1A and 1B, an exemplary cementitious panel 100 is shown. The wallboard panel 100 includes a core material 102 sandwiched between a foam material layer 101 and one or more sheets of backing material 103. In some embodiments, an adhesive or binder may be included in the core material 102 to adhere the sheets of backing material 103 or the foam material layer 101 to the core material 102. The adhesive or binder may include starch, dextrin, polyester resin, poly(vinyl acetate), poly (ethylene-co-vinyl acetate), polyvinyl alcohol, styrene butadiene, epoxies, acrylics, polyimides, polyurethanes, cyanoacrylates, hot melt adhesives and so forth.

The core material 102 of a wallboard panel 100 may include any hydraulically setting material, such as gypsum, synthetic gypsum, various cement types including but not limited to Portland cements (e.g., Portland blast-furnace slag cement or blast furnace cement, Portland-fly ash cement, Portland pozzolan cement, Portland silica fume cement, masonry cements, expansive cements), non-hydraulic cements, pozzolan-lime cements, slag-lime cements, super-sulfated cements, calcium sulfoaluminate cements, "natural" cements, geopolymer cements, polymer cements, and blends thereof. The core material may include any cementitious core material. The core material 102 may be formulated by preparing a slurry that includes water, one or more of such hydraulically setting materials, and other additives such as setting accelerants, antidessicants, waterproofing agents, dispersants, set retarders, surfactants, strength enhancers, natural and synthetic polymers, and reinforcing materials such as organic or inorganic aggregates, biocides, glass fibers, colorants, pigments, and the like.

Typically, wallboard panels 100 commonly referred to as wallboard, drywall, gypsum board, and the like are formed from a cementitious core material 102 that primarily contains gypsum. Gypsum commonly refers to a mineral composed primarily of calcium sulfate dihydrate, which has the chemical formula $CaSO_4 \cdot 2H_2O$. Gypsum may be obtained from naturally occurring calcium sulfate in anhydrous, dihydrate, or hem ihydrate state. Alternatively, gypsum may be obtained synthetically, from industrial scrubbers such as using a flue-gas desulfurization process. A slurry of gypsum to be used as a core material 102 for a cementitious panel may be formed by mixing water with powdered anhydrous calcium sulfate ($CaSO_4$) and/or calcium sulfate hem ihydrate ($CaSO_4 \cdot \frac{1}{2}H_2O$), commonly referred to as calcined gypsum, stucco, or plaster of Paris. Calcined gypsum is typically prepared by heating pulverized uncalcined gypsum rock in a mill such as a rotary kiln, hammer mill, impact mill, and others or simultaneously heating and pulverizing uncalcined gypsum in a mill to yield stucco predominantly including calcium sulfate hem ihydrate and to release water vapor. Calcined gypsum (i.e., calcium sulfate hem ihydrate) has the desirable property of being chemically reactive with water and will "set" rather quickly when the two are mixed together, yielding calcium sulfate dihydrate.

In some embodiments, the wallboard panel 100 may be a cementitious panel commonly referred to as cement board, backer board, fiber cement siding, and the like formed from a cementitious core material 102 that primarily contains Portland cement and organic or inorganic aggregate. Portland cement commonly refers to a blend of hydraulically setting materials that primarily includes hydraulic calcium silicates ($3CaO \cdot SiO_2$ and $2CaO \cdot SiO_2$). Additionally, Portland cement may include one or more forms of calcium sulfate, magnesium oxide, aluminum oxide, and iron oxide. Organic aggregate may include cellulose fibers, wood flakes, and the like. In certain embodiments, the cementitious panel may include certain inorganic aggregates such as construction aggregate, including coarse to medium grained particulate material used in construction including, but not limited to, sand, gravel, crushed stone, slag, recycled concrete and geosynthetic aggregates.

Figure 1C:
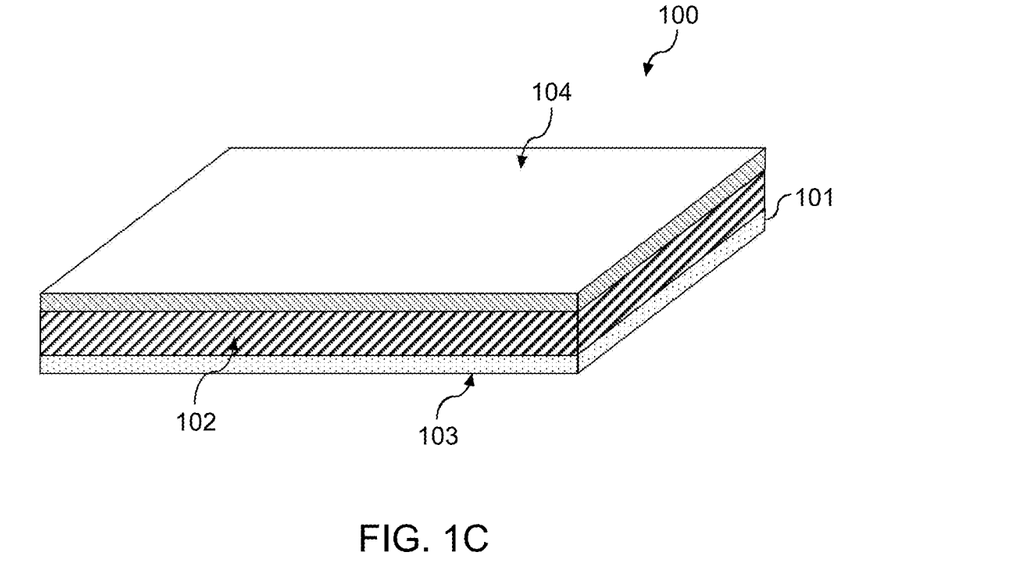
FIG. 1C schematically shows a perspective view of an exemplary wallboard panel.
Figure 1D:
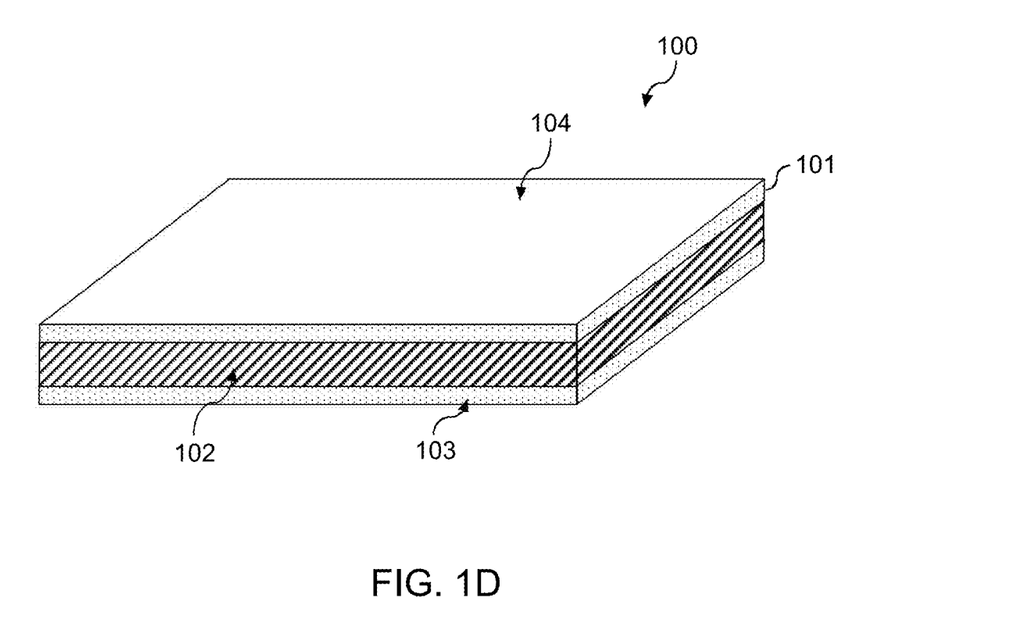
FIG. 1D schematically shows a perspective view of an exemplary wallboard panel.

In certain embodiments, as shown in FIG. 1A, the foam material layer 101 may comprise the one or more sheets of facing material 104 of the wallboard 100. In certain embodiments, the foam material layer 101 can include additional sheets of facing material situated over the foam material layer 101, so that the foam material layer does not face the interior of the room. When the one or more sheets of facing material 104 contains the foam material layer 101, the backing material 103 may include one or more sheets of paper or paperboard facing material, woven or non-woven fibers or filaments, glass mat, glass mesh, and/or a polymeric-film facing material. In certain embodiments, the foam material layer 101 may comprise the one or more sheets of backing material 103 of the wallboard 100, as shown in FIG. 1C. When the one or more sheets of backing material 103 contains the foam material layer 101, the facing material 104 may include one or more sheets of paper or paperboard facing material, woven or non-woven fibers or filaments, glass mat, glass mesh, and/or polymeric-film facing material. In certain embodiments, the foam material layer 101 may comprise the one or more sheets of facing material 104 and one or more sheets of the backing material 103, as shown in FIG. 1D.

Further, in some embodiments, the core material 102 may penetrate at least one side of the foam material layer 101, as shown in FIG. 1B. In certain embodiments, the core material 102 may penetrate the foam material layer 101 according to a certain depth (Pd). In some embodiments, the core material 102 does not penetrate through the entire thickness of the foam material layer. In some embodiments, the distance that the core material 102 penetrates the foam material layer 101, i.e. Pd, is up to about 99%, such as up to about 95%, such as up to about 90%, such as up to about 80%, such as up to about 70%, such as up to about 60%, such as up to about 50%, such as up to about 40%, such as up to about 30%, such as up to about 20%, such as up to about 25%, such as up to about 10%, such as up to about 5% of the total thickness of the foam material layer 101. In some embodiments, the core material 102 may penetrate the entire thickness of the foam material layer 101. Still in some embodiments, the distance that the core material 102 penetrates the foam material layer 101, i.e. Pd, may be at least about 5, such as at least about 10%, such as at least about 15%, such as at least about 25% of the total thickness of the foam material layer 101. Without being bound by any particular theory, the distance that the core material 102 penetrates the foam material layer is sufficient to create a physical-bond between the core material 102 and the foam material layer 101. Thus, the penetration depth (i.e. Pd), may be any depth suitable for securing the foam material layer 101 to the core material 102.

Depending on the thickness of the foam material layer, in certain embodiments the penetration depth, Pd, may be less than about 5 mm, such as less than about 4 mm, such as less than about 3 mm, such as less than about 2 mm, such as less than about 1 mm.

In certain embodiments, given the penetration of the core material 102 into the foam material layer 101 the need for additional fillers, additives, or adhesives into the core material 102 to secure the core material 102 to one or more sheets of facing material, such as the foam material layer 101, is unnecessary. Accordingly, in certain embodiments, the core material 102 does not contain any additional adhesive material.

In certain embodiments, the foam material layer 101 may be comprised of any suitable material including a polymer. The polymer may be a thermoplastic or a thermoset. In one embodiment, the foam material layer 101 may include a thermoplastic. In another embodiment, the foam material layer may include a thermoset. The polymer may be polyurethane, polyester, polyethylene, ethylenevinylacetate, ethylenepropylenediene, polypropylene, polyvinylchloride, polysiloxane, polystyrene, polyisocyanurate, nitrile, vinyl nitrile, ethylene propylene diene monomer, neoprene (or polychloroprene), styrene butadiene rubber, phenolic foam, or a combination thereof. In this regard, in one embodiment, the material may be a polyurethane, a polyester, or a combination thereof. For instance, in one embodiment, the material may be a polyurethane. The polyurethane may be a flexible polyurethane or a rigid polyurethane. In another embodiment, the material may be a polyester. In certain embodiments the foam material layer 101 may be comprised of a reticulated ester-based polyurethane. In certain embodiments the foam material layer 101 may be comprised of an ether-based polyurethane. In certain embodiments the foam material layer 101 may be comprised of a reticulated polyester. In certain embodiments the foam material layer 101 may be comprised of an impregnated polyurethane. In certain embodiments the foam material layer 101 may be comprised of a melamine. Commercially available foam materials that may be incorporated into the wallboards 100 disclosed herein may include the following foam materials manufactured by Recitel: Urecom®, Thermoflex®, Bulpren®, Firend®, Rebounce™ polyurethane foam, Copopren® acoustic foam, Pottscore® foam, Soundmat foam composites, and combinations thereof. For example, in certain embodiments the foam material layer 101 comprises at least one sheet of Urecom®. In certain embodiments, the foam material layer 101 comprises at least one sheet of Thermoflex®. In some embodiments, the foam material layer 101 comprises at least one sheet of Bulpren®. In some embodiments, the foam material layer 101 comprises at least one sheet of Firend®. In certain embodiments, the foam material layer may comprise at least one sheet of microcellular polyurethane foam. Suitable examples of microcellular polyurethane foam include those available from Rogers Corporation such as the PORON® industrial polyurethanes, including PORON® 4701-30 Polyurethane, PORON® 4701-40 Polyurethane, PORON® 4701-50 Polyurethane, PORON® 4701-60 Polyurethane, PORON® 4790-92 Polyurethane, PORON® 4790-79 Polyurethane, PORON® AquaPro™ Series Foam, PORON® Dura-Shape™ materials, PORON® EVExtend Material, PORON® ShockPad Foam, PORON® SHOCKSEAL™ Foam, PORON® Thin-Stik™ Materials, PORON® HeatSorb™ Materials, PORON® Condux Plus™ Foams, and combinations thereof. In certain embodiments, the foam material layer may comprise a melamine-based foam such as those available from BASF® available as under the Basotect® line of foam materials.

In certain embodiments, the foam material layer 101 may be selected based on certain desired thermal or acoustical control properties for the wallboard 100.

In some embodiments, the foam material layer 101 includes one or more pores 110. In certain embodiments, the foam material layer 101 may have one or more pores that are generally classified as an open pore geometry or an open-celled foam. Indeed, foams having an open pore geometry generally contain interconnected cells, which allow for the passage of gas or a fluid through the void space from one cell to the next. This is contrary to closed-cell foams, which do not have interconnected cell openings. In some embodiments, at least 0.01% to about 100% of the one or more pores contain an open pore geometry. In some embodiments, at least 10% to about 90% of the one or more pores contain an open pore geometry. In some embodiments, at least about 20% to about 80% of the one or more pores contain an open pore geometry. Accordingly, in certain embodiments, at least 0.01%, such as at least 1%, such as at least 10%, such as at least 20%, such as at least 30%, such as at least 40%, such as at least 50%, such as at least 60%, such as at least 70%, such as at least 80%, such as at least 90% of the one or more pores contain an open pore geometry. In addition, in certain embodiments, 100% or less, such as 95% or less, such as 90% or less, such as 85% or less, such as 80% or less, such as 75% or less of the one or more pores contain an open pore geometry. In some embodiments, at least 50% to up to 95% or less of the pores contain an open pore geometry. In some embodiments, at least 50% to up to 85% or less of the pores contain an open pore geometry. In some embodiments, at least 50% to up to 75% or less of the pores contain an open pore geometry. In certain embodiments an "open pore geometry" can mean a reticulated geometry. Generally, a reticulated geometry for a foam material is one that has a permeable structure of open cells and continuous ligaments. Accordingly, in certain embodiments, the open pore geometry may include a reticulated geometry.

In some embodiments, the foam material layer 101 may include one or more pores that are generally classified as a closed pore geometry or a closed pore foam. Closed cell foams are those in which the cells are enclosed and typically are tightly pressed together. Generally, closed cell foams may have a higher density and greater pressure resistance. In some embodiments, at least 1% to about 100% of the one or more pores may contain a closed pore geometry. In some embodiments, at least 10% to about 90% of the one or more pores may contain a closed pore geometry, such as at least 20%, such as at least 30%, such as at least 40%, such as at least 50%, such as at least 60%. In certain embodiments, the foam material layer 101 may include one or more sheets of foam material having an open pore geometry and one or more sheet of foam material having a closed pore geometry.

In some embodiments, the foam material layer 101 may include any suitable filler material. The filler material may be at least partially incorporated into one or more cells 100 of the foam material layer 101. In certain embodiments, the filler material may be evenly dispersed throughout the foam material layer 101. Additionally, one or both surfaces of the foam material layer 101 may be coated with a dispersion of the filler material. Whether dispersed within the one or more cells 110 of the foam material layer 101 or coated on a surface of the foam material layer 101, the filler material may impart desired properties to the wallboard panels formed with the foam material layer 101 as described herein. For example, the filler material may be utilized to provide additional sound absorption properties, thermal resistant properties, and/or flame resistant properties to the wallboard 100. In some embodiments, however, the foam material layer 101 may not include a filler material. In some embodiments, the foam material layer 101 may include one or more fillers including, but not limited to, polymer films, fire retardant fillers, fire inhibitor fillers, charring additives, UV stabilizers, colorants, phosphorous containing compounds, calcium carbonate, mica, clays, expandable graphite (EG), zeolites, zinc oxides, boron containing compounds, 9,10-dihydro-9-oxa-10phosphaphenanthrene-10-oxide (DOPO), and combinations thereof.

In certain embodiments, the foam material layer 101 can include one or more layers of foam material. For example, in certain embodiments one or more layers of foam material may be secured together via a suitable glue or other adhesive prior to being applied to the wallboards 100 disclosed herein. For example, one or more layers of foam material having different pore geometries can be secured together prior to being applied to the wallboards 100 disclosed herein. Also, in certain embodiments, the foam material layer 101 can include one or more foam material layers that may be secured together with one or more non-foam layer materials, foil layers, or one or more foam material layers having a closed pore geometry. Accordingly, the foam material layer 101 as described herein, can include additional material layers without deviating from the scope of the present disclosure.

In addition to the foam material layer described herein, the wallboards described herein, namely the core material 102, foam material layer 101, one or more sheets of facing material, and one or more sheets of backing material may additionally contain a wide variety of conventional additives. For example, the wallboard may include processing aids, stabilizers (e.g., heat stabilizers, ultra violet light stabilizers, etc.), antidegradants (e.g., antioxidants and/or antiozonants), biocides, antifungal agents, viscosity modifiers, plasticizers, natural and synthetic polymers, reinforcing additives, strength enhancers, waterproofing aids, anti-skid compositions, surfactants, colorants, pigments, and the like. For instance, colorants or pigments may be added to provide the facing with a desired color characteristic. Such additives each are typically included in amount of less than 15 wt. %, such as less than 10 wt. %, such as less than 5 wt. %, such as less than 1 wt. %.

A foam material layer 101 may be provided with any desired thickness, as may be selected for the particular application and performance requirements. In some embodiments, the foam material layer may have a thickness of about 0.01 mm or more, such as about 0.1 mm or more, such as about 1 mm or more, such as about 5 mm or more, such as about 10 mm or more, such as about 15 mm or more, such as about 20 mm or more. The foam material layer may have a thickness of about 50 mm or less, such as about 45 mm or less, such as about 40 mm or less, such as about 35 mm or less, such as about 30 mm or less, such as about 25 mm or less, such as about 20 mm or less. In certain embodiments, the foam material layer may have a thickness at least 6 mm, such as 7 mm, such as 8 mm, such as 9 mm, such as 10 mm. The foam material layer may have a maximum thickness of 50 mm or less, such as less than 30 mm, such as less than 20 mm, such as less than 18 mm, such as less than 16 mm, such as less than 14 mm, such as less than 12 mm, such as less than 10 mm, such as less than 9 mm, such as less than 8 mm, such as less than 7 mm, such as less than 6 mm. In certain embodiments, the foam material layer may have a thickness ranging from 6 mm to about 10 mm.

Figure 2A:
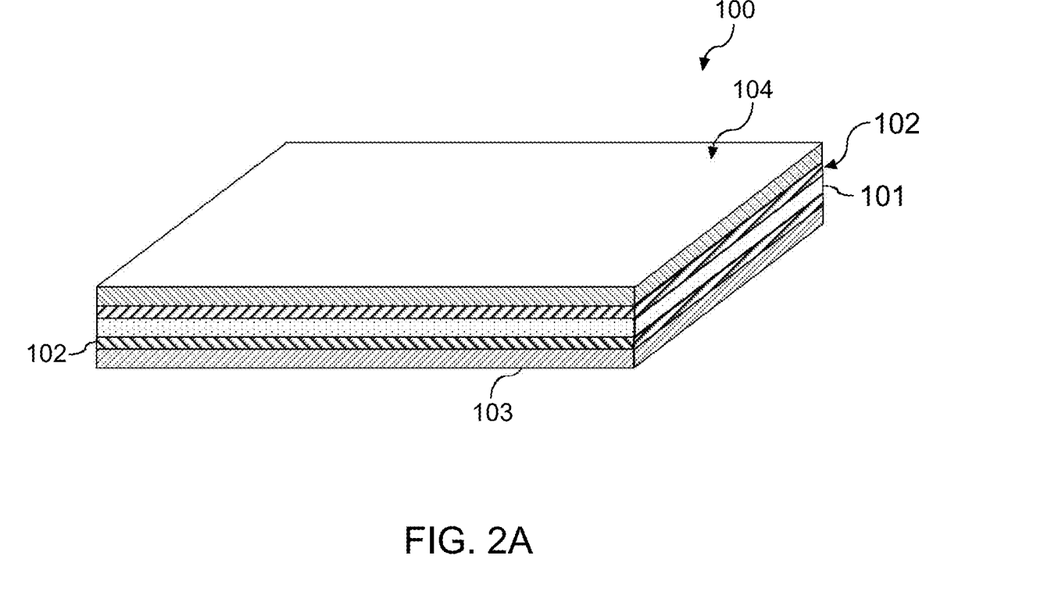
FIG. 2A schematically shows a perspective view of an exemplary wallboard panel.
Figure 2B:
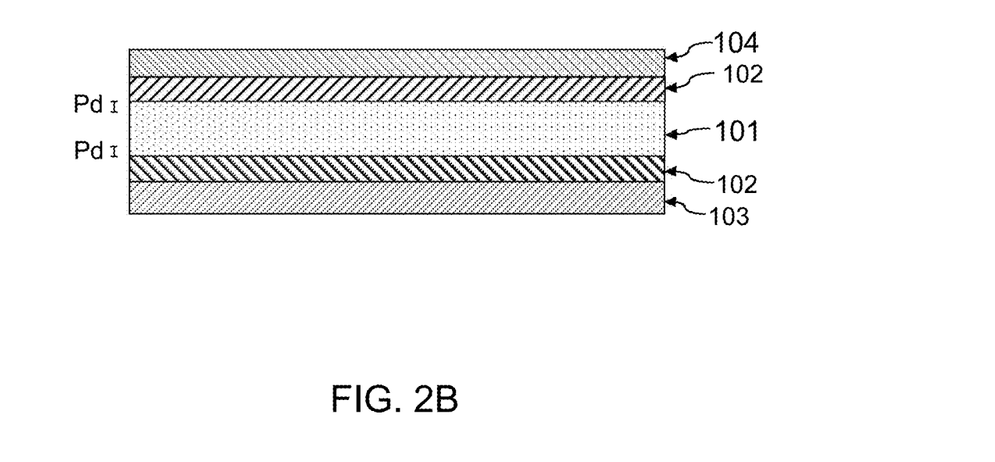
FIG. 2B schematically shows a cross-sectional view of an exemplary wallboard panel.

FIGS. 2A and 2B depict an exemplary wallboard panel 100 that includes a core material 102 having the foam material layer 101 contained therein. The wallboard panel 100 also includes one or more sheets of facing material 104 (i.e. a facer) and one or more sheets of backing material 103 (i.e. a backer).

Now referring to FIGS. 2A and 2B, an exemplary cementitious panel 100 is shown. The wallboard panel 100 includes a core material 102 having a foam material layer 101 sandwiched by core material 102. One or more sheets of facing material 104 are then applied to one side of the core material 102. One or more sheets of backing material 103 may then applied to the other side of the core material 102. The one or more sheets of facing material 104 may be the same material or different material from the one or more sheets of backing material 103. Accordingly, in certain embodiments the core includes a foam material layer 101 surrounded by core material 102. In some embodiments, an adhesive or binder may be included in the core material 102 to adhere the one or more sheets of backing material 103 or the one or more sheets of facing material 104 to the core material 102. The adhesive or binder may include starch, dextrin, polyester resin, poly(vinyl acetate), poly(ethylene-co-vinyl acetate), polyvinyl alcohol, styrene butadiene, epoxies, acrylics, polyimides, polyurethanes, cyanoacylates, hot melt adhesives and so forth.

The core material 102 of a wallboard panel 100 may include any hydraulically setting material and may be formulated as mentioned above. As also mentioned above, the wallboard panel may be one formed primarily from gypsum or cement.

In certain embodiments, as shown in FIGS. 2A and 2B, the foam material layer 101 is included in the core of the wallboard 100. In certain embodiments, one or more foam material layers 101 may be included in the core of the wallboard 100.

In some embodiments, the core material 102 may penetrate at least one side of the foam material layer 101, as shown in FIG. 2B. For example, the foam material layer 101 may include a first side and a second side. The core material may penetrate the first side of the foam material layer 101 and/or the second side of the foam material layer. In certain embodiments, the core material 102 may penetrate the foam material layer 101 according to a certain depth (Pd). In some embodiments, the core material 102 does not penetrate through the entire thickness of the foam material layer. In some embodiments, the distance that the core material 102 penetrates the foam material layer 101, i.e. Pd, is as mentioned above. For instance, in certain embodiments, the penetration depth (i.e. Pd) may be from about 0.01% to about 100% of the total thickness of the foam material layer. For example, in certain embodiments, the penetration depth may be about 100% of the total thickness of the foam material layer, which would provide a polymer and foam network within the core material 102, such as a gypsum core, that could be used to improve certain impact properties of the wallboard.

Depending on the thickness of the foam material layer, in certain embodiment the penetration depth, Pd, may be less than about 5 mm, such as less than about 4 mm, such as less than about 3 mm, such as less than about 2 mm, such as less than about 1 mm.

In certain embodiments, where the core material 102 is applied to both a first side and a second side of the foam material layer, there may be two penetration depths (Pd). For example, there may be a first penetration depth corresponding to the depth the core material penetrates the foam material layer 101 on the first side and the second penetration depth corresponding to the depth the core material penetrates the foam material layer 101 on the second side. In some embodiments, first penetration depth and the second penetration depth are such that neither penetration depth distances extend far enough into the thickness of the foam layer to completely impregnate the foam material layer 101. In other words, the core material 102 does not penetrate far enough into the thickness of the foam to impregnate or fill the open pore structure of the foam material layer 101. However, in certain embodiments, the first penetration depth and the second penetration depth are such that both extend far enough into the thickness of the foam material layer to completely impregnate the foam material layer. In such embodiments, i.e. where the foam layer is completely impregnated by the core material 102, the resulting structure provided is a polymer/foam network within a core material 102, such as a gypsum core, that provides a composite material that might be suitable for improving the impact properties of a wallboard.

In certain embodiments, given the penetration of the core material 102 into the foam material layer 101 the need for additional fillers, additives, or adhesives into the core material 102 to secure the core material 102 to the foam material layer 101, is unnecessary. Accordingly, in certain embodiments, the core material 102 does not contain any additional adhesive material.

In certain embodiments, the foam material layer 101 may be comprised of any suitable material as mentioned above. The foam material layer 101 may also include any suitable filler material or additive as mentioned above. The foam material layer may have a pore geometry as also mentioned above. The foam material layer may also have a thickness as mentioned above.

The one or more sheets of facing material 104 and one or more sheets of backing material 103 may be comprised of one or more sheets of paper, paperboard, woven or non-woven fabrics, glass mat, glass, mesh, mineral wool, such as BASF SLENTEX, and combinations thereof. The outer surface of the one or more sheets of facing material 104 and one or more sheets of backing material 103 may also be coated with any suitable coating. The coating may be a continuous layer or film, such as a laminate or laminate film, on the surface of the one or more sheets of facing material 104 or the one or more sheets of backing material 103. The coating may be applied such that it is able to penetrate into the one or more sheets of facing material 104 or the one or more sheets of backing material 103. In certain embodiments, the coating may be applied in a manner so as to not completely fill any pores in the one or more sheets of facing material 104 or the one or more sheets of backing material 103. However, in some embodiments, a coating may be applied to the one or more sheets of facing material 104 or one or more sheets of backing material 103 so as to create a nonporous film.

The coating may be comprised of a coating formulation that may further include any number of other components known in the art of formulating coatings. These other components may include, for example, flow control agents, thixotropic agents, fillers, anti-gassing agents, organic co-solvents, catalysts, and the like.

In certain embodiments, the coating on the one or more sheets of facing material 104 may include one or more sheets of metal, such as aluminum. Without being bound by any particular theory, the coating containing aluminum may provide IR radiant barrier qualities to reduce the amount of heat absorbed by the wallboard. In some embodiments, the facing material 104 may include one or more sheets of laminate material or be covered by a suitable film material.

In some embodiments, the foam material layer 101 may include one or more materials that provide fire-resistive properties. For example, wallboards 100 containing a foam material layer 101 comprised of FIREND® or melamine may provide fire resistant properties. Such fire-resistive properties may be provided by way of promotion of char formation, forming an intumescent barrier, forming a glaze barrier, and/or conversion of combustible gases to non-flammable gases.

Manufacturing System

Figure 3:
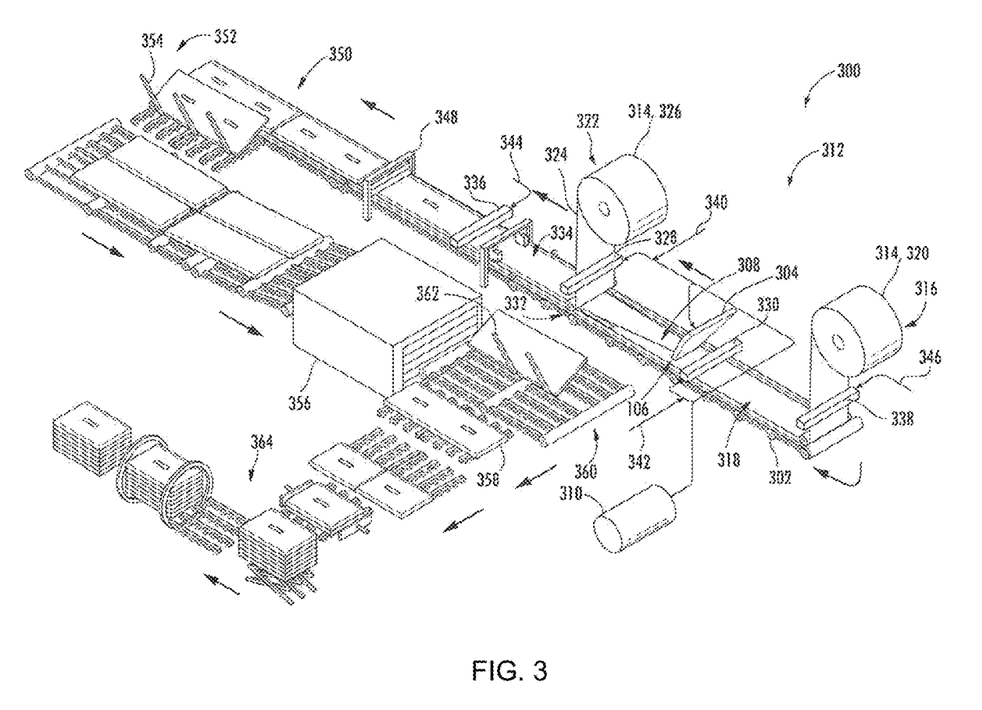
FIG. 3 schematically shows an exemplary system for manufacturing a cementitious panel.

Now referring to FIG. 3, an exemplary system 300 for manufacturing cementitious panels, such as the wallboards disclosed herein is shown. The exemplary system 300 includes a conveyor assembly 302 such as a continuous belt or fabric, a cementitious core material supply manifold 304 positioned above a surface of the continuous belt or fabric of the conveyor assembly 302. The cementitious core material supply manifold 304 includes an outlet such as a chute or "boot" configured to apply a slurry of cementitious core material 308 so as apply a layer of cementitious core material 308 which will be formed into the core layer 102 of a cementitious panel 100. The slurry of cementitious core material 308 may be provided from a mixing apparatus 310, such as a pin mixer, hatchek, batch mixture, ribbon mixer, master roller, eductor, high-shear mixer, or extruder. The slurry of cementitious core material 308 may be provided by mixing dry and wet ingredients in the mixing apparatus 310. The dry ingredients can include, but are not limited to, any combination of cementitious material such as calcium sulfate hem ihydrate and known additives, such as fiberglass, accelerator, and in some cases natural or synthetic polymers (e.g., starch). The wet ingredients can be made of many components, including but not limited to, surfactants, dispersants, defoamers, retarders, rheology modifiers, a mixture of water, paper pulp, pigments, colorants, biocides, waterproofing agents, and other additives, such as potash and natural or synthetic polymer (e.g., starch). The exemplary system 300 may further include a facing material supply assembly 312 configured to supply to the conveyor assembly 302 a plurality of sheets of facing material 104 from a plurality of facing material supply rolls 314. In one embodiment, the plurality of sheets of facing material include an upper sheet and a lower sheet. For purposes of convenience, the lower sheet refers to the sheet of facing material that is closer to the conveyor assembly 302, and the upper sheet refers to the sheet of facing material that is further away from the conveyor assembly. In certain embodiments, the facing material 14 may comprise a foam material layer 101. The foam material layer 101 may be fed from the facing material supply rolls 314. Typically, cementitious panels are formed front-side down, such that the lower sheet corresponds to the front-side of the panel. However, cementitious panels may also be formed back-side down, such that the lower sheet corresponds to the back-side of the panel. The exemplary embodiments that follow describe a system for manufacturing cementitious panels in which the panels are formed front-side down. However, these examples are provided by way of illustration only and should not be interpreted at limiting the present disclosure.

As shown in FIG. 3, a lower facing material supply assembly 316 supplies a lower sheet of facing material 318 to the conveyor assembly 302 from a lower facing material supply roll 320. An upper facing material supply assembly 322 supplies an upper sheet of facing material 324 to the conveyor assembly 302 from an upper facing material supply roll 326. The slurry of cementitious core material 308 flows from the outlet and spreads onto a moving continuous lower sheet of facing material 318, while a moving continuous upper sheet of facing material 314 is applied on the slurry of cementitious material 308. The exemplary system 300 may further include a dense or supplemental layer applicator assembly configured to apply a dense or supplemental layer to the upper sheet of facing material 324 and/or to the lower sheet of facing material 318 upstream from the supply manifold 304.

As shown, the system 300 includes an upper dense or supplemental layer applicator assembly 328 and a lower dense or supplemental layer applicator assembly 330. The upper dense or supplemental layer applicator assembly 328 may include for example, a roller assembly and/or a nozzle assembly configured to apply a slurry of cementitious material 308 to the inward side of the upper sheet of facing material 324 in a manner such that the slurry forms a dense or supplemental layer. Similarly, the lower dense or supplemental layer applicator assembly 330 may include for example, a roller assembly and/or a nozzle assembly configured to apply a slurry of cementitious material 308 to the inward side of the lower sheet of facing material 318 in a manner such that the slurry forms a dense or supplemental layer.

The slurry of cementitious material 308 used to form a dense or supplemental layer may be of similar composition to that used to form the core layer 102 except that the dense or supplemental layer typically exhibits a greater concentration of gypsum crystals and a lower concentration of void volumes. This may be accomplished through the manner in which the slurry of cementitious material 308 is applied when forming the dense or supplemental layer. For example, the dense or supplemental layer applicator assembly may be configured to reduce or minimize the introduction of air that may generate foam. Additionally, or in the alternative, the concentration of wet ingredients (e.g., defoamer or dispersant) may be modified to achieve the desired dense or supplemental layer properties. In some embodiments, the slurry of cementitious material 308 used to form the dense or supplemental layer may be supplied to the upper and/or lower dense or supplemental layer applicator assembly 328, 330 from the same mixing apparatus 310 from which cementitious material 308 is supplied to the supply manifold 304. Alternatively, a separate or additional mixing apparatus (not shown) may be utilized to supply cementitious material to the upper and/or lower dense or supplemental layer applicator assembly 328, 330. For example, a separate or additional mixing apparatus may be utilized when desiring to include different ingredients or different concentrations of ingredients in the dense or supplemental layer.

The exemplary system 300 further includes a forming assembly 332 configured to form a continuous length of cementitious panel material 334 to a desired thickness and width. At the forming assembly, the lower sheet of facing material 318 and/or the upper sheet of facing material 324 may be folded, wrapped, and/or pressed, or the like, so as to surround the slurry of cementitious core material 308. For example, the lower sheet of facing material 318 may wrap around the slurry of cementitious core material 308 and onto the upper sheet of facing material 324. Alternatively, or in addition, the upper sheet of facing material 324 may wrap around the slurry of cementitious core material 308 and onto the lower sheet of facing material 318. An adhesive may be utilized for adhering the upper sheet of facing material and the lower sheet of facing material 318 to one another.

In some embodiments, the exemplary system may include a coater assembly system configured to apply a coating to the upper sheet of facing material 324 and/or to the lower sheet of facing material 318. As shown, the system 300 includes an upper coater assembly 336 and a lower coater assembly 338. The upper coater assembly 336 may include for example, a roller assembly and/or a nozzle assembly configured to apply a coating to the outward side of the upper sheet of facing material 324. Similarly, the lower coater assembly 338 may include for example, a roller assembly and/or a nozzle assembly configured to apply a coating to the outward side of the lower sheet of facing material 318. Such a coating may be applied to the upper or lower sheet of facing material 324, 318 so as to provide a facing material 104 with a plurality of layers. For example, a facing material 104 may include a first layer 116 of facing material 104 applied to a second layer 118 of facing material 104 using a coater assembly 336, 338. The upper coater assembly 336 and/or the lower coater assembly 338 may be located either upstream or downstream from the forming assembly 332. As shown, the upper coater assembly 336 is located downstream from the forming assembly 332 and the lower coater assembly 338 is located upstream from the forming assembly 332. A coater assembly 336, 338 may be desirable for providing coatings with different formulations or properties, such as formulations or properties that may vary as between different grades of cementitious panels 100. Alternatively, or in addition, cementitious panels may be formed using facing material that has already been coated. For example, the facing material supply rolls 314 may supply a facing material that has a plurality of layers, including a coated facing material.

Filler materials may be included in the core layer 102, the one or more sheets of facing material 104, and/or the dense or supplemental layer of a cementitious panel 100. The filler material may be supplied from a storage tank (not shown), which may be provided in the form of a permanent tank, a portable tote, or rolling stock equipped with a tank or tote. In some embodiments, filler material may be introduced into the mixing apparatus 310 as a dry ingredient and/or as a wet ingredient. A slurry of cementitious core material 308 supplied from the mixing apparatus 310 may thereby include a filler material. A slurry cementitious core material 308 that includes a filler material may be supplied to the supply manifold 304 so as to form cementitious panels 100 that include filler material in the core layer 102. Additionally, or in the alternative, a slurry cementitious core material 308 that includes a filler material may be supplied to the upper dense or supplemental layer applicator assembly 328 and/or to the lower dense or supplemental layer applicator assembly 330 so as to form cementitious panels 100 that include filler material in the dense or supplemental layer.

In some embodiments, a filler material may be introduced to the upper dense or supplemental layer applicator assembly 328 and/or to the lower dense or supplemental layer applicator assembly 330 through a dense or supplemental layer supply line. As shown, an upper dense or supplemental layer supply line 340 may supply a filler material to the upper dense or supplemental layer applicator assembly 328, and a lower dense or supplemental layer supply line 342 may supply a filler material to the lower dense or supplemental layer applicator assembly 330. The upper dense or supplemental layer supply line 340 and/or the lower dense or supplemental layer supply line 342 may be utilized to introduce filler material to the corresponding dense or supplemental layer(s) in different quantities than that of the central core layer 103 and/or to introduce filler material to the dense or supplemental layer(s) that differ in composition from filler material introduced into the central core layer 103. For example, in one embodiment, a filler material may be included in the dense or supplemental layer(s) without including the filler material in the central core layer 103. In another embodiment, the dense or supplemental layer(s) may include a first filler material and the central core layer 103 may include a second filler material, in which the first filler material differs from the second filler material in respect of concentration and/or composition.

In some embodiments, a filler material may be introduced to the upper coater assembly 336 and/or to the lower coater assembly 338 through a coater assembly supply line. As shown, an upper coater assembly supply line 344 may supply a filler material to the upper coater assembly 336, and a lower coater assembly supply line 346 may supply a filler material to the lower coater assembly 338. In some embodiments, the upper coater assembly 336 may be used to introduce a filler material to the upper sheet of facing material 324 and/or the lower coater assembly 338 may be used to introduce a filler material to the lower sheet of facing material 318. Additionally, or in the alternative, cementitious panels may be formed using facing material that already includes filler material. For example, the facing material supply rolls 314 may supply a facing material that includes a filler material.

After passing through the forming assembly 332, the continuous length of cementitious panel material 334 is cut with a cutting device 348 such as a saw blade, water knife, or other suitable device to provide a series of sequential cementitious panels 350 of a desired length. Typically, the cutting device 348 will be positioned a sufficient distance downstream from the forming assembly 332 such that the core material has set sufficiently to retain its shape. In some embodiments, vacuum boxes may be positioned along the conveyor assembly 302 to remove excess water.

The cementitious panels 350 continue along the conveyor assembly 302 for some distance, allowing the cementitious core material to further cure. Typically, the cementitious panels 350 are formed front-side down, and after the cementitious panels 350 have sufficiently cured, they are typically turned front-side up at a wet transfer table 352 to protect the front side of the panels from being damaged by the conveyor assembly 302. The wet transfer table 352 may include an articulating lifting and lowering mechanism 354, which has a first set of forks or arms that lift the cementitious panel from its first broad face onto its edge, and a second set of forks or arms that lower the cementitious panel onto its opposite side, bringing the cementitious panel to rest on its second broad face. The cementitious panels 350 are dried in an oven or kiln 356 or other suitable drying apparatus to evaporate excess (free) water while chemically bound water is retained in gypsum crystals formed through the curing process. The cementitious panels 350 are typically dried front-side up, as the wet transfer table 352 with an articulating lifting and lowering mechanism 354 is typically provided to turn the cementitious panel over prior to heating the cementitious panel in the oven or kiln 356. Typically, the cementitious core material 308 partially sets prior to being heated in the oven or kiln 356, and then further at least partially sets during heating in the oven or kiln 356. After exiting the oven or kiln 356, dried cementitious panels 358 are bundled in pairs of two or as needed, with front-sides facing one another, at a dry transfer table 360. The dry transfer table typically includes a similar articulating lifting and lowering mechanism 362, which lifts and lowers a first cementitious panel on top of a second cementitious panel. The dried panels 358 may be further cut to desired sizes and bundled together for transfer to a warehouse or for shipping, using various forms of finishing equipment 364.

Exemplary methods of manufacturing cementitious panels will be discussed. Exemplary methods may be performed using the exemplary system 300 described herein, including any combination or arrangement of various features of such systems. Additionally, exemplary methods may be performed to make any of the cementitious panels described herein, including any combination or arrangement of various features of such panels. An exemplary method includes formulating a gypsum slurry, dispensing the gypsum slurry on a first side of a foam material layer, and rolling one or more backing material sheets over the gypsum slurry. In such embodiments, the foam material layer may comprise one or more sheets of the facer material or the entire facer itself. Indeed, the foam material layer may include one or more pores having an open pore geometry or reticulated geometry. Dispensing the gypsum slurry on a first side of the foam material allows the gypsum slurry to penetrate the one or more pores of the foam material layer, thus securing the gypsum slurry on the first side of the foam material layer.

In certain embodiments, an exemplary method includes formulating a gypsum slurry, dispensing the gypsum slurry on a first side of a foam material layer, dispensing one or more facing material sheets over the gypsum slurry, dispensing the gypsum slurry on a second side of the foam material layer, and rolling one or more backing material sheets over the gypsum slurry.

In certain other embodiments, an exemplary method includes formulating a gypsum slurry, dispensing the gypsum slurry on a first side of a facing material sheet, dispensing a foam material layer on the gypsum slurry, dispensing gypsum slurry on a second side of the foam material layer, and rolling one or more backing material sheets over the gypsum slurry. In this regard, such method may allow for disposing of the foam material layer within the gypsum core.

In certain embodiments, the foam material layer includes one or more pores having an open pore geometry. Thus, the gypsum slurry, once dispensed, is able to penetrate the one or more pores of the foam material layer, thus securing the gypsum slurry to the first side of the foam material layer. In some embodiments, the gypsum slurry is also able to penetrate the one or more pores of the foam material layer, thus securing the gypsum slurry to the second side of the foam material layer. Thus, in some embodiments, the gypsum slurry is able to create a physical-bond between the gypsum slurry and the foam material layer. Once dried, the gypsum core material is secured to the foam material layer.

In some embodiments provided is a method for manufacturing a wallboard panel. The method can include conveying a slurry of gypsum core material, a foam material layer, and a plurality of sheets of backing material, forming a continuous length of gypsum panel material comprising the slurry of gypsum core material surrounded by the foam material layer and the plurality of sheets of backing material, and cutting the continuous length of the gypsum panel material laterally to a desired length, thus providing a wallboard panel.

In some embodiments, provided is a method of manufacturing a wallboard panel. The method may include conveying a slurry of gypsum core material, a foam material layer, a plurality of sheets of facing material, and a plurality of sheets of backing material, forming a continuous length of gypsum panel material containing the foam material layer surrounded by the gypsum core material, the plurality of sheets of facing material, and the plurality of sheets of backing material, and cutting the continuous length of the gypsum panel material laterally to a desired length, thus providing a wallboard panel.

The board weight of the cementitious board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The board weight may be about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating device (e.g., kiln).

In addition, the cementitious board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The cementitious board may have a certain nail pull resistance, which generally is a measure of the force required to pull a gypsum panel off a wall by forcing a fastening nail through the panel. The values obtained from the nail pull test generally indicate the maximum stress achieved while the fastener head penetrates through the board surface and core. In this regard, the cementitious board exhibits a nail pull resistance of at least about 25 lbf, such as at least about 30 pounds, such as at least about 35 lbf, such as at least about 40 lbf, such as at least about 45 lbf, such as at least about 50 lbf, such as at least about 55 lbf, such as at least about 60 lbf, such as at least about 65 lbf, such as at least about 70 lbf, such as at least about 75 lbf, such as at least about 77 lbf, such as at least about 80 lbf, such as at least about 85 lbf, such as at least about 90 lbf, such as at least about 95 lbf, such as at least about 100 lbf as tested according to ASTM C1396. The nail pull resistance may be about 150 lbf or less, such as about 140 lbf or less, such as about 130 lbf or less, such as about 120 lbf or less, such as about 110 lbf or less, such as about 105 lbf or less, such as about 100 lbf or less, such as about 95 lbf or less, such as about 90 lbf or less, such as about 85 lbf or less, such as about 80 lbf or less as tested according to ASTM C1396. The nail pull resistance may be about 150 lbf or more as tested according to ASTM C1396. Such nail pull resistance may be based upon the thickness of the cementitious board. For instance, when conducting a test, such nail pull resistance values may vary depending on the thickness of the cementitious board. As an example, the nail pull resistance values above may be for a ⅝ inch board. However, it should be understood that instead of a ⅝ inch board, such nail pull resistance values may be for any other thickness cementitious board as mentioned herein.

The cementitious board may have a certain compressive strength. For instance, the compressive strength may be from about 20 psi to about 3000 psi. For example, in some embodiments, the compressive strength may be about 20 psi or more, such as about 30 psi or more, such as about 40 psi or more, such as about 50 psi or more, such as about 60 psi or more, such as about 70 psi or more, such as about 80 psi or more, such as about 90 psi or more, such as about 100 psi or more, such as about 110 psi or more, such as about 120 psi or more, such as about 130 psi or more, such as about 140 psi or more, such as about 150 psi or more, such as about 200 psi or more, such as about 250 psi or more, such as about 300 psi or more, such as about 350 psi or more, such as about 375 psi or more, such as about 400 psi or more, such as about 500 psi or more, such as about 600 psi or more, such as about 700 psi or more, such as about 800 psi or more, such as about 900 psi or more, such as about 1000 psi or more, such as about 1100 psi or more, such as about 1200 psi or more, such as about 1300 psi or more, such as about 1400 psi or more, such as about 1500 psi or more, such as about 1600 psi or more, such as about 1700 psi or more, such as about 1800 psi or more, such as about 1900 psi or more, such as about 2000 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the thickness of the cementitious board. For instance, when conducting a test, such compressive strength values may vary depending on the thickness of the cementitious board. As an example, the compressive strength values above may be for a ⅝ inch board. However, it should be understood that instead of a ⅝ inch board, such compressive strength values may be for any other thickness cementitious board as mentioned herein.

In addition, the cementitious board may have a core hardness of at least about 2 lbf, such as at least about 4 lbf, such as at least about 6 lbf, such as at least about 8 lbf, such as at least about 10 lbf, such as at least about 11 lbf, such as at least about 12 lbf, such as at least about 15 lbf, such as at least about 18 lbf, such as at least about 20 lbf as tested according to ASTM C1396. The cementitious board may have a core hardness of 100 lbf or less, such as about 90 lbf or less, such as about 80 lbf or less, such as about 70 lbf or less, such as about 60 lbf or less, such as about 50 lbf or less, such as about 40 lbf or less, such as about 35 lbf or less, such as about 30 lbf or less, such as about 25 lbf or less, such as about 20 lbf or less, such as about 18 lbf or less, such as about 15 lbf or less as tested according to ASTM C1396. In addition, the cementitious board may have an end hardness according to the aforementioned values. Further, the cementitious board may have an edge hardness according to the aforementioned values. Such core hardness may be based upon the thickness of the cementitious board. For instance, when conducting a test, such core hardness values may vary depending on the core density, additives, and calcination of the cementitious board. As an example, the core hardness values above may be for a ⅝ inch board. However, it should be understood that instead of a ⅝ inch board, such core hardness values may be for any other thickness cementitious board as mentioned herein.

Furthermore, the cementitious board may have a certain thermal conductivity. For instance, the thermal conductivity may be 0.03 W/m*K or more, such as 0.04 W/m*K or more, such as 0.05 W/m*K or more, such as 0.06 W/m*K or more, such as 0.07 W/m*K or more, such as 0.08 W/m*K or more, such as 0.09 W/m*K or more, such as 0.1 W/m*K or more, such as 0.11 W/m*K or more, such as 0.12 W/m*K or more. The thermal conductivity may be 0.5 W/m*K or less, such as 0.4 W/m*K or less, such as 0.3 W/m*K or less, such as 0.25 W/m*K or less, such as 0.2 W/m*K or less, such as 0.18 W/m*K or less, such as 0.15 W/m*K or less, such as 0.13 W/m*K or less, such as 0.11 W/m*K or less, such as 0.1 W/m*K or less, such as 0.08 W/m*K or less. The thermal conductivity may be determined in accordance with ASTM C518-17. Such thermal conductivity may be based upon the thickness of the cementitious board. For instance, when conducting a test, such thermal conductivity values may vary depending on the core density, additives, and calcination of the cementitious board. As an example, the thermal conductivity values above may be for a ⅝ inch board. However, it should be understood that instead of a ⅝ inch board, such thermal conductivity values may be for any other thickness cementitious board as mentioned herein.

In addition, the cementitious board may have a certain thermal resistance. For instance, the thermal resistance may be 0.03 $K*m^2/W$ or more, such as 0.05 $K*m^2/W$ or more, such as 0.08 $K*m^2/W$ or more, such as 0.1 $K*m^2/W$ or more, such as 0.13 $K*m^2/W$ or more, such as 0.15 $K*m^2/W$ or more, such as 0.18 $K*m^2/W$ or more. The thermal resistance may be 0.5 $K*m^2/W$ or less, such as 0.4 $K*m^2/W$ or less, such as 0.3 $K*m^2/W$ or less, such as 0.28 $K*m^2/W$ or less, such as 0.25 $K*m^2/W$ or less, such as 0.22 $K*m^2/W$ or less, such as 0.2 $K*m^2/W$ or less, such as 0.17 $K*m^2/W$ or less, such as 0.15 $K*m^2/W$ or less, such as 0.13 $K*m^2/W$ or less, such as 0.11 $K*m^2/W$ or less. The thermal resistance may be determined in accordance with ASTM C518-17. Such thermal resistance may be based upon the thickness of the cementitious board. For instance, when conducting a test, such thermal resistance values may vary depending on the core density, additives, and calcination of the cementitious board. As an example, the thermal resistance values above may be for a ⅝ inch board. However, it should be understood that instead of a ⅝ inch board, such thermal resistance values may be for any other thickness cementitious board as mentioned herein.

Also, the cementitious board may have a certain R-value. For instance, the R-value may be 0.03 or more, such as 0.05 or more, such as 0.1 or more, such as 0.2 or more, such as 0.3 or more, such as 0.4 or more, such as 0.5 or more, such as 0.6 or more, such as 0.7 or more, such as 0.8 or more, such as 0.9 or more, such as 1 or more, such as 1.3 or more, such as 1.5 or more, such as 1.8 or more, such as 2 or more. The R-value may be 5 or less, such as 4.5 or less, such as 4 or less, such as 3.5 or less, such as 3 or less, such as 2.5 or less, such as 2.2 or less, such as 2 or less, such as 1.8 or less, such as 1.5 or less, such as 1.4 or less, such as 1.3 or less, such as 1.2 or less, such as 1.1 or less, such as 1 or less, such as 0.9 or less, such as 0.8 or less, such as 0.7 or less. The R-value may be determined in accordance with ASTM C518-17. Such R-value may be based upon the thickness of the cementitious board. For instance, when conducting a test, such R-values may vary depending on the core density, additives, and calcination of the cementitious board. As an example, the R-values above may be for a ⅝ inch board. However, it should be understood that instead of a ⅝ inch board, such R-values may be for any other thickness cementitious board as mentioned herein.

In addition, as indicated herein, the foam material layer may be able to provide the cementitious material with certain mechanical properties, in particular impact properties. For instance, in accordance with a soft body impact test as conducted in accordance with ASTM C1629/C1629M-06 (2011), the impact resistance may be 200 J or more, such as 220 J or more, such as 240 J or more, such as 250 J or more, such as 260 J or more, such as 265 J or more, such as 275 J or more, such as 290 J or more, such as 300 J or more, such as 320 J or more, such as 340 J or more, such as 360 J or more, such as 380 J or more. The impact resistance may be 500 J or less, such as 460 J or less, such as 430 J or less, such as 410 J or less, such as 400 J or less, such as 390 J or less, such as 370 J or less, such as 350 J or less, such as 330 J or less, such as 300 J or less, such as 280 J or less. In this regard, in one embodiment, the board may have a classification of 2 or a classification of 3 for the soft body impact test. Also, in accordance with a hard body impact test as conducted in accordance with ASTM C1629/C1629M-06 (2011), the impact resistance may be 100 J or more, such as 120 J or more, such as 140 J or more, such as 160 J or more, such as 180 J or more, such as 200 J or more, such as 220 J or more. The impact resistance may be 300 J or less, such as 260 J or less, such as 220 J or less, such as 210 J or less, such as 200 J or less, such as 190 J or less, such as 170 J or less, such as 150 J or less. In this regard, in one embodiment, the board may have a classification of 2 or a classification of 3 for the hard body impact test. Such impact resistance may be based upon the thickness of the cementitious board. For instance, when conducting a test, such impact resistance values may vary depending on the core density, additives, and calcination of the cementitious board. As an example, the impact resistance values above may be for a ⅝ inch board. However, it should be understood that instead of a ⅝ inch board, such impact resistance values may be for any other thickness cementitious board as mentioned herein.

EXAMPLES

Test Methods

Thermal Conductivity, Thermal Resistance, R-Value: The terminal conductivity, thermal resistance, and R-value of the board were measured in accordance with ASTM C518-17.

Example 1

In this example, a polymeric foam material was provided as a facing material or within the gypsum. Samples 1 and 2 included a ¼" reticulated polyurethane foam on the face and in the core, respectively. Samples 3 and 4 included a 10 mm polyurethane foam in the core. Samples 5 and 6 included a melamine foam in the core (¼" foam) and on the face (⅛"), respectively. The board had a thickness of approximately ⅝ inches. The thermal properties of the board were determined as provided below.

| Sample | Board Weight (lbs/MSF) | Thermal Conductivity (W/m*K) | Thermal Resistance (K*m²/W) | R-Value |
| --- | --- | --- | --- | --- |
| Control 1 | 2707 | — | — | — |
| Control 2 | 2490 | — | — | — |
| Control 3 | 1796 | 0.16 | 0.096 | 0.544 |
| Control 4 | 1880 | 0.153 | 0.104 | 0.587 |
| Sample 1 | 1601 | 0.082 | 0.198 | 1.125 |
| Sample 2 | 1605 | 0.091 | 0.18 | 1.022 |
| Sample 3 | 1814 | 0.102 | 0.161 | 0.914 |
| Sample 4 | 1858 | 0.114 | 0.14 | 0.797 |
| Sample 5 | 1800 | 0.131 | 0.125 | 0.708 |
| Sample 6 | 1896 | 0.105 | 0.152 | 0.862 |

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A wallboard panel, comprising:
a cementitious core material, wherein the cementitious core material comprises gypsum core material;
one or more sheets of facing material comprising a first polymer foam material layer, the first polymer foam material layer comprising a first plurality of pores having an open pore geometry, the first plurality of pores being randomly distributed, wherein the cementitious core material penetrates the first plurality of pores of the first polymer foam material layer, wherein the cementitious core material does not penetrate through the full thickness of the first polymer foam material layer; and
one or more sheets of backing material comprising a second polymer foam material layer, the second polymer foam material layer comprising a second plurality of pores having an open pore geometry, the second plurality of pores being randomly distributed, wherein the cementitious core material penetrates the second plurality of pores of the second polymer foam material layer, wherein the cementitious core material does not penetrate through the full thickness of the second polymer foam material layer;
wherein the cementitious core material is between the one or more sheets of facing material and the one or more sheets of backing material.

2. The wallboard panel of claim 1, wherein at least 0.01% to about 100% of the first plurality of pores comprises an open pore geometry.

3. The wallboard panel of claim 1, wherein the first polymer foam material layer has a thickness ranging from about 0.01 mm to about 50 mm.

4. The wallboard panel of claim 1, wherein the first polymer foam material layer has a thickness ranging from about 6 mm to about 10 mm.

5. The wallboard panel of claim 1, wherein the first polymer foam material layer comprises a polyurethane.

6. The wallboard panel of claim 1, wherein the first polymer foam material layer comprises a reticulated ester-based polyurethane.

7. The wallboard panel of claim 1, wherein the first polymer foam material layer comprises an ether-based polyurethane.

8. The wallboard panel of claim 1, wherein the first polymer foam material layer comprises an impregnated polyurethane.

9. The wallboard panel of claim 1, wherein the first polymer foam material layer comprises a polyester.

10. The wallboard panel of claim 1, wherein the first polymer foam material layer comprises a reticulated polyester.

11. The wallboard panel of claim 1, wherein the first polymer foam material layer comprises melamine.

12. The wallboard panel of claim 1, wherein the one or more sheets of backing material further comprise one or more sheets of paper.

13. The wallboard panel of claim 1, wherein the one or more sheets of facing material further comprise a filler material.

14. The wallboard panel of claim 1, wherein the panel has a thermal conductivity of from 0.03 W/m*K to 0.5 W/m*K, a thermal resistance of from 0.03 K*m²/W to 0.3 K*m²/W, and/or an R-value of from 0.4 to 5.

15. The wallboard panel of claim 1, wherein the panel has a soft body impact resistance of from 200 J to 500 J and/or a hard body impact resistance of from 100 J to 300 J.

16. The wallboard panel of claim 1, wherein the cementitious core material primarily contains gypsum.

17. A wallboard panel, comprising:
a cementitious core material, wherein the cementitious core material comprises gypsum core material;
one or more sheets of facing material comprising a first polymer foam material layer, the first polymer foam material layer comprising a first plurality of pores having an open pore geometry, the first plurality of pores being randomly distributed, wherein the cementitious core material penetrates the first plurality of pores of the first polymer foam material layer, the cementitious core material penetrating the first plurality of pores of the first polymer foam material layer at a depth of 5% or more of a thickness of the first polymer foam material layer, wherein the penetration of the first plurality of pores of the first polymer foam material layer by the cementitious core material secures the first polymer foam material layer to the cementitious core material; and
one or more sheets of backing material comprising a second polymer foam material layer, the second polymer foam material layer comprising a second plurality of pores having an open pore geometry, the second plurality of pores being randomly distributed, wherein the cementitious core material penetrates the second plurality of pores of the second polymer foam material layer, the cementitious core material penetrating the second plurality of pores of the second polymer foam material layer at a depth of 5% or more of a thickness of the second polymer foam material layer, wherein the penetration of the second plurality of pores of the second polymer foam material layer by the cementitious core material secures the second polymer foam material layer to the cementitious core material;
wherein the cementitious core material is between the one or more sheets of facing material and the one or more sheets of backing material.

18. The wallboard panel of claim 17, wherein the cementitious core material primarily contains gypsum.

* * * * *